US012651192B2

(12) United States Patent
Griffin et al.

(10) Patent No.: US 12,651,192 B2
(45) Date of Patent: Jun. 9, 2026

(54) QUANTUM CODE SPACE ADMINISTRATION

(71) Applicant: Red Hat, Inc., Raleigh, NC (US)

(72) Inventors: Leigh Griffin, Waterford (IE); Stephen Coady, Dublin (IE)

(73) Assignee: Red Hat, LLC, Raleigh, NC (US)

( * ) Notice: Subject to any disclaimer, the term of this patent is extended or adjusted under 35 U.S.C. 154(b) by 76 days.

(21) Appl. No.: 18/897,100

(22) Filed: Sep. 26, 2024

(65) Prior Publication Data

US 2026/0087398 A1 Mar. 26, 2026

(51) Int. Cl.
*G06N 10/70* (2022.01)
(52) U.S. Cl.
CPC .................................... *G06N 10/70* (2022.01)
(58) Field of Classification Search
None
See application file for complete search history.

(56) References Cited

U.S. PATENT DOCUMENTS

| | | | | |
|---|---|---|---|---|
| 12,099,903 B2* | 9/2024 | Inoue | ..................... | G06N 10/40 |
| 2013/0096698 A1* | 4/2013 | Ulyanov | ............ | G05B 13/0295 |
| | | | | 700/30 |
| 2020/0412369 A1* | 12/2020 | Jiang | ...................... | G06N 10/20 |
| 2025/0148335 A1* | 5/2025 | Zhang | ...................... | G06N 5/01 |
| 2025/0200410 A1* | 6/2025 | Rosenfeld | .............. | G06N 10/20 |

* cited by examiner

*Primary Examiner* — Mujtaba M Chaudry
(74) *Attorney, Agent, or Firm* — Dority & Manning, P.A.

(57) ABSTRACT

Systems and methods are provided. An example method can include obtaining, by a quantum computing system comprising one or more quantum computing devices, first data indicative of a first risk of quantum error associated with a first quantum process and second data indicative of a second risk of quantum error associated with the first quantum process. The example method can further include routing, by the quantum computing system based at least in part on the first data, a first portion of the first quantum process to first quantum hardware implementing a first plurality of qubits in a first quantum code space. The example method can further include routing, by the quantum computing system based at least in part on the second data, a second portion of the first quantum process to second quantum hardware implementing a second plurality of lower-fidelity qubits outside of the first quantum code space.

20 Claims, 4 Drawing Sheets

QUANTUM CODE SPACE ADMINISTRATION

BACKGROUND

Quantum computing is a method for using quantum mechanical properties of physical systems to perform computations. Quantum computing uses quantum bits, referred to herein as "qubits," each of which has quantum mechanical properties that may differ from non-quantum bits used in classical computing. For example, a quantum state of a quantum bit can include a superposition of two or more basis states, such as $¿0¿$ and $¿1⟩$, which can be analogous to the binary states 0 and 1 of a classical computer. As another example, a quantum state of two or more quantum bits can become entangled, such that the states of the two or more quantum bits are correlated.

SUMMARY

The present disclosure is generally directed to systems and methods for managing usage of a high-fidelity but resource-intensive quantum code space.

In one implementation, a method is provided. The method includes obtaining, by a quantum computing system comprising one or more quantum computing devices, first data indicative of a first risk of quantum error associated with a first quantum process. The method further includes routing, by the quantum computing system based at least in part on the first data, a first portion of the first quantum process to first quantum hardware implementing a first plurality of qubits in a first quantum code space. The method further includes obtaining, by the quantum computing system, second data indicative of a second risk of quantum error associated with the first quantum process. The method further includes routing, by the quantum computing system based at least in part on the second data, a second portion of the first quantum process to second quantum hardware implementing a second plurality of qubits outside of the first quantum code space, wherein each qubit of the first plurality of qubits has a qubit fidelity that is higher than a qubit fidelity of each qubit of the second plurality of qubits.

In another implementation, a quantum computing system is provided. The quantum computing system includes first quantum hardware implementing a first plurality of qubits in a first quantum code space. The quantum computing system includes second quantum hardware implementing a second plurality of qubits outside of the first quantum code space, wherein each qubit of the first plurality of qubits has a qubit fidelity that is higher than a qubit fidelity of each qubit of the second plurality of qubits. The quantum computing system includes one or more processor devices to route, based on first data indicative of a first risk of quantum error, a first portion of a first quantum process to the first quantum hardware. The one or more processor devices are further to route, based on second data indicative of a second risk of quantum error, a second portion of the first quantum process to the second quantum hardware.

In another implementation, a non-transitory computer-readable storage medium is provided. The non-transitory computer-readable storage medium includes executable instructions to cause a processor device to obtain first data indicative of a first risk of quantum error associated with a first quantum process. The instructions further cause the processor device to route, based at least in part on the first data, a first portion of the first quantum process to first quantum hardware implementing a first plurality of qubits in a first quantum code space. The instructions further cause the processor device to obtain second data indicative of a second risk of quantum error associated with the first quantum process. The instructions further cause the processor device to route, based at least in part on the second data, a second portion of the first quantum process to second quantum hardware implementing a second plurality of qubits outside of the first quantum code space, wherein each qubit of the first plurality of qubits has a qubit fidelity that is higher than a qubit fidelity of each qubit of the second plurality of qubits.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
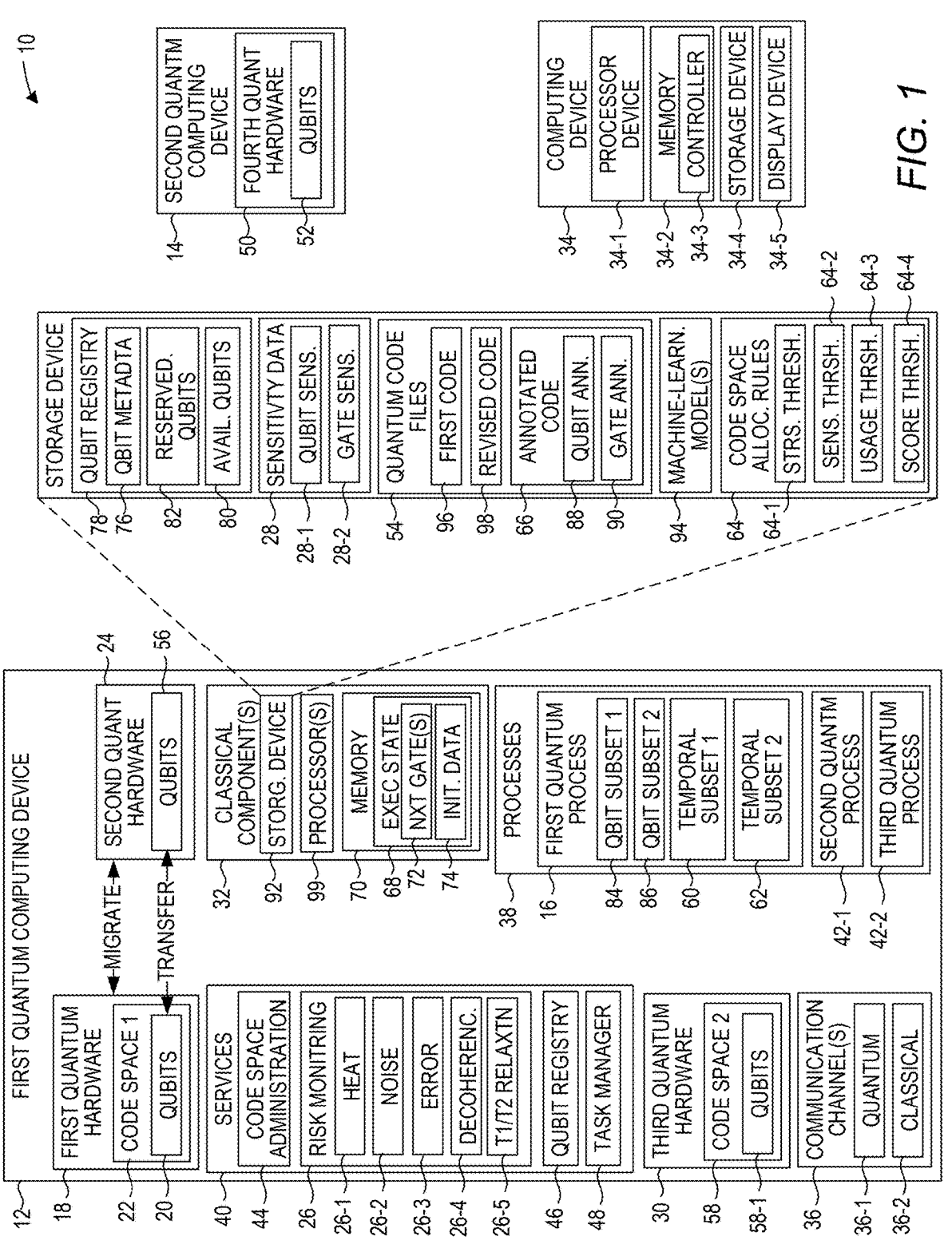
FIG. 1 is a block diagram of an environment in which examples disclosed herein may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Quantum computations can be subject to various kinds of errors, which can pose a significant challenge in designing a quantum computing device or quantum computing algorithm. For example, some quantum mechanical states of a quantum hardware circuit, such as quantum superposition states or quantum entanglement states, can be short-lived (e.g., lasting less than one millisecond) or highly sensitive to environmental factors, such as heat, electromagnetic noise (e.g., radio-frequency noise, microwave noise, infrared noise, etc.), or other sources of error. For example, in some instances, an aluminum-based superconducting qubit may need to be kept at a temperature below 1.2 Kelvin (about negative 457 degrees Fahrenheit) to function at all, and its quantum state may be disrupted by the smallest environmental interactions, such as an interaction with a single stray photon.

One technique to reduce error rates of a quantum computation is to perform the quantum computation on quantum hardware implementing a quantum code space. Quantum code space hardware can be, for example, hardware that uses additional resources (e.g., quantum hardware resources, error correction resources, noise reduction resources, etc.) to provide higher-fidelity (i.e., less error-prone) quantum mechanical states or higher-fidelity quantum operations (e.g., quantum gates, etc.) compared to some alternative quantum hardware.

However, higher-fidelity quantum code space hardware can be resource-intensive compared to lower-fidelity quantum hardware. For example, in some instances, hardware implementing a quantum code space may reduce a quantum error rate by using a greater number (e.g., five times as many, nine times as many, etc.) of quantum mechanical components (e.g., Josephson junctions, trapped ions, etc.) per quantum bit (qubit) compared to quantum hardware that does not implement a quantum code space. As another example, in some instances, hardware implementing a quantum code space may reduce a quantum error rate by performing a greater number of circuit operations (e.g., readouts, resets, etc.) per quantum gate compared to some alternative quantum hardware. In some instances, it may be undesirable or infeasible to use a resource-intensive quantum code space for the entirety of every quantum computation being performed.

The examples set forth below provide various techniques for leveraging a quantum code space in a manner that can maximize the error reduction benefits of the quantum code space, while limiting resource usage associated with the quantum code space. For example, the examples set forth below include various systems and methods for routing particularly sensitive or error-prone quantum computations to a high-fidelity quantum code space, while routing less sensitive or error-prone quantum computations to less resource-intensive quantum hardware. In some examples, a quantum computing system can perform real-time monitoring of environmental factors (e.g., heat, noise, etc.) that may influence a risk of quantum error, and can perform on-demand routing of higher-error-risk quantum computations to higher-fidelity quantum code spaces. Additionally, in some examples, a quantum computing system can identify particularly sensitive operations of a quantum computation, such as qubits or quantum gates that may have an outsize influence on a final output of a quantum computation, and can route more sensitive operations to higher-fidelity quantum code spaces.

In addition to intelligent routing of quantum computations, the examples set forth below provide a variety of additional techniques for leveraging a quantum code space to reduce quantum error rates. For example, in some instances, quantum computing code can be tested by executing the quantum computing code a first time in a high-fidelity quantum code space; executing the quantum computing code a second time using lower-fidelity quantum hardware; and comparing the results of the two executions. The comparison can be used to identify which operations of the quantum computing code are particularly sensitive or prone to error. This information can then be used in various ways. In some examples, a quantum code file can be annotated with sensitivity data so that more sensitive operations can be routed to higher-fidelity quantum code spaces when the quantum code is executed in the future. In some examples, a human programmer or a machine learning system can use the sensitivity data to revise the quantum computing code to reduce a future risk of error.

The examples set forth below provide a variety of technical effects and benefits, such as reduced error rates or reduced computational costs of some quantum computations compared to some alternative implementations. For example, in some instances, the examples set forth below can provide reduced error rates compared to some alternative implementations, such as implementations that perform quantum computations on lower-fidelity quantum hardware without implementing a quantum code space. In some instances, the examples set forth below can provide reduced computational costs (e.g., hardware costs per qubit, hardware costs per quantum gate, number of operations per quantum gate, electricity cost of operations, etc.) compared to some alternative implementations, such as implementations that execute an entirety of every quantum computation on high-fidelity quantum code space hardware.

FIG. 1 is a block diagram of an environment in which examples disclosed herein may be practiced. A quantum computing system 10 comprising one or more quantum computing devices 12, 14 can route some portions of a first quantum process 16 to first quantum hardware 18 implementing a first plurality of qubits 20 in a first quantum code space 22, and can route other portions of the first quantum process 16 to second quantum hardware 24 that does not comprise a quantum code space. In some instances, such routing can include on-demand routing based on real-time risk data received from one or more risk monitoring services 26. In some instances, the routing can include predetermined routing based on qubit-specific or gate-specific sensitivity data 28, which can indicate which qubits or gates of the first quantum process 16 are particularly sensitive to errors.

A first quantum computing device 12 can include, for example, quantum hardware 18, 24, 30; classical computing components 32, such as any components that may be included in a classical computing device 34; or other hardware components to facilitate one or more quantum computing processes (e.g., control hardware such as control signal generators, cryogenic hardware, noise dissipation hardware, etc.). In some instances, a quantum computing device 12 can include or have access to various communication channels 36, such as quantum communication channels 36-1 or classical communication channels 36-2. In some instances, communications channels 36 can include communication channels between the first quantum computing device and another device (e.g., second quantum computing device 14, classical computing device 34, etc.) or between components of the first quantum computing device (e.g., between first quantum hardware 18 and second quantum hardware 24, etc.). In some instances, a quantum computing device 12 can include one or more executing classical or quantum processes 38 or services 40, such as the first quantum computing process 16; one or more other quantum processes 42-1, 42-2; risk monitoring services 26;

a code space administration service 44; a qubit registry service 46; a quantum task manager 48; or other processes or services.

A second quantum computing device 14 can be a quantum computing device that is separate from the first quantum computing device 12. The second quantum computing device 14 can include, for example, fourth quantum hardware 50 comprising a plurality of qubits 52. In some instances, the second quantum computing device 14 and components thereof can have any property described herein with respect to a first quantum computing device 12 and components thereof. Although FIG. 1 depicts the quantum computing system 10 having two quantum computing devices 12, 14, a quantum computing system can have any number of quantum computing devices 12, 14 (e.g., one, five, ten, etc.) without deviating from the scope of the present disclosure.

A first quantum process 16 can be, for example, any executing process that may use one or more quantum devices (e.g., qubit devices, etc.) to perform quantum computations. In some instances, a first quantum process 16 can be an executing quantum algorithm or quantum computation that is defined by quantum computing code, such as code stored in a quantum computing code file 54 (e.g., quantum assembly language (QASM) file, etc.).

First quantum hardware 18 can include, for example, quantum device hardware for performing quantum computations. For example, first quantum hardware 18 can be, include, or otherwise be associated with a plurality of qubits 20 in a quantum code space 22. First quantum hardware 18 can include hardware for various types of quantum computing, such as trapped ion quantum computing, photonic quantum computing, superconducting quantum computing, neutral atom quantum computing, or other type of quantum computing.

Qubits 20 can include, for example, any quantum device or combination of devices that can be used to represent a quantum bit, such as superconducting qubit devices, trapped ion qubit devices, neutral atom qubit devices, photonic qubit devices, nitrogen vacancy qubit devices, or other qubit device. As used herein, qubits 20 can refer to quantum mechanical devices capable of maintaining a quantum state that can include one or more of a superposition between basis states and an entanglement with one or more other qubits 20. However, the term "qubit" can also refer generally to both "physical" qubits, which can include physical devices in which a quantum state is maintained, and "logical" qubits, which can refer to a logical or computational state represented by the physical devices (e.g., $|0\rangle$ basis state, $|1\rangle$ basis state, superposition of basis states, multi-qubit entangled states, etc.). In some instances, a logical qubit can be represented by one quantum mechanical device or can be encoded in the combined state of a plurality of quantum mechanical devices (e.g., according to a quantum error correction code, etc.). In such instances, a qubit 20 can include a single quantum mechanical device or a plurality of quantum mechanical devices associated with a single logical qubit.

A first quantum code space 22 can include, for example, hardware for implementing a quantum code space, wherein additional resources (e.g., additional hardware, additional computational cycles, etc.) can be used to provide higher-fidelity operations (e.g., higher-fidelity qubits 20, reduced decoherence of qubits 20, etc.) compared to quantum hardware that does not comprise a quantum code space. In some instances, a first quantum code space 22 can include a code space associated with a quantum error correction code (e.g., repetition code, surface code, etc.). In some instances, quantum code space 22 hardware can include a plurality of quantum mechanical devices for each qubit 20, such that a quantum mechanical state of each logical qubit is encoded in a plurality of physical quantum mechanical devices. In some instances, quantum code space 22 hardware can include hardware for performing one or more computations for preventing or correcting error (e.g., readouts, resets, etc.). In some instances, quantum code space 22 hardware can include hardware for reducing the impact of noise, heat, or other sources of error (e.g., filter hardware, cryogenic thermalization hardware, etc.).

Second quantum hardware 24 can be, for example, quantum hardware that is separate from the first quantum hardware 18. In some instances, second quantum hardware 24 can include hardware that does not implement a quantum code space, such as qubits 56 that are not associated with a quantum code space. In other respects, second quantum hardware 24 can have any property described herein with respect to first quantum hardware 18, and vice versa.

Risk monitoring services 26 can include, for example, an executing process configured to monitor system properties that may be associated with a risk of quantum computational error. For example, in some instances, a quantum computing system (e.g., cryogenic quantum computing system, etc.) may be highly sensitive to heat, noise, or other sources of error. In some instances, risk monitoring services 26 can include one or more executing processes configured to monitor various metrics of system stress, such as a heat monitoring service 26-1 to measure heat stress, system temperatures, heat-related risk, or the like; a noise monitoring service 26-2 to monitor noise levels (e.g., electromagnetic noise levels, infrared noise levels, microwave crosstalk levels, etc.), noise stress, or noise-related risk; an error monitoring service 26-3 to monitor detected error rates, error risk, or the like; a decoherence monitoring service 26-4 to monitor various system properties or metrics that may be associated with qubit decoherence, such as two-level-system defect interactions, qubit frequencies, magnetic flux, or other properties that may be associated with a risk of qubit decoherence or an expected coherence time of one or more qubits 20; a T1/T2 relaxation risk monitor to monitor various system properties or metrics that may be associated with an expected rate of T1 or T2 relaxation of one or more qubits 20; or other risk monitoring services.

In some instances, a quantum computing device 12 can route portions of a first quantum process 16 to quantum hardware 18, 24 based on risk data indicative of a current level of system stress of the quantum computing device 12, such as system stress data received from the risk monitoring services 26.

For example, in some instances, a code space administration service 44 can periodically receive system stress data (e.g., heat data, noise data, error rate data, qubit decoherence data, T1/T2 relaxation data, etc.) indicative of a current system stress level associated with the first quantum computing device 12 or component thereof (e.g., quantum hardware 18, 24, 30, etc.). In some instances, the code space administration service 44 can route portions of the quantum process to appropriate quantum hardware 18, 24, 30 based on this system stress data.

For example, in some instances, the first quantum computing device 12 can receive (e.g., from a user or device) a request to initialize a first quantum process 16. Responsive to receiving the request, the first quantum computing device 12 can use initial system stress data from the risk monitoring services 26 (e.g., system data collected before initialization of the first quantum process 16, such as before an initialization request is received) to determine an initial routing of all or part of the first quantum process 16 to appropriate quantum hardware 18, 24, 30, 50. Based on the initial routing, the first quantum computing device 12 can begin executing the first quantum process 16 on the selected quantum hardware 18, 24, 30, 50.

In some instances, the first quantum computing device 12 can begin executing the first quantum process 16 on the selected quantum hardware, and can continue receiving system stress data from the risk monitoring services 26. In some instances, the first quantum computing device 12 can subsequently re-assign all or part of the first quantum process 16 to new quantum hardware 18, 24, 30, 50 based on the updated system stress data. For example, in some instances, the first quantum computing device 12 can execute a first temporal subset 60 on initial quantum hardware 18, 24, 30, 50 associated with an initial routing; receive, during execution of the first temporal subset 60, from the risk monitoring services 26, updated system stress data indicative of a change in system stress or a change in a risk of quantum computational error associated with the first quantum process 16; and route, based on the updated system stress data, a second temporal subset 62 of the first quantum process 16 to new quantum hardware 18, 24, 30, 50 different from the initial quantum hardware 18, 24, 30, 50. A temporal subset 60, 62 can be, for example, a time-based subset of a time-based sequence of computational operations (e.g., sequence of quantum gates, etc.), such as all operations of a first quantum process 16 that occur before or after a particular time; before or after a particular computing operation (e.g., quantum gate, etc.) or group of operations; or the like.

In some instances, routing all or part of a first quantum process 16 can include applying one or more code space allocation rules 64. For example, in some instances, routing can include applying one or more code space allocation rules 64 to one or more system stress indicators or other indicators of a risk of quantum stress (e.g., sensitivity data 28, etc.). In some instances, routing can include applying one or more code space allocation rules 64 to other data, such as resource usage data. In some instances, a code space allocation rule 64 can include one or more thresholds, such as a system stress threshold 64-1 (e.g., heat threshold, noise threshold, decoherence risk threshold, etc.), qubit- or gate-specific sensitivity threshold 64-2, resource usage threshold 64-3, or a combined threshold such as a score-based threshold 64-4. In some instances, applying a code space allocation rule 64 can include comparing a single data value to a single threshold, such as comparing a current heat value to a heat stress threshold 64-1, etc. In some instances, applying a code space allocation rule 64 can include making a plurality of comparisons, such as comparing a plurality of data values (e.g., system stress values, resource usage values, qubit or gate sensitivity values, etc.) to a plurality of corresponding thresholds 64-1, 64-2, 64-3, 64-4.

In some instances, data values used to determine a routing can include resource usage values, such as current levels of resource usage; estimated resource usage costs associated with all or part of a first quantum process 16; or other resource usage values. In some instances, a code space administration service 44 can receive current resource usage data from a quantum task manager service 48. The quantum task manager service 48 can track various kinds of resource usage data, such as total usage or availability of quantum hardware 18, 24, 30 or qubits 20, 56, 58-1; total usage or availability of another resource, such as electricity, cryogenic cooling capacity, communication bandwidth, control hardware capacity, or the like; process-specific usage of various resources; or other resource usage data. In some instances, an estimated resource usage cost associated with a first quantum process 16 can be estimated from a quantum code file 54 associated with the first quantum process 16 (e.g., using a machine-learned model, using a static code analysis, etc.) or can be stored in an annotated code file 66 comprising resource usage annotation data. In some instances, resource usage annotation data can include data indicative of past resource usage associated with past executions of quantum code stored in the annotated code file 66.

In some instances, a code space allocation rule comprising a plurality of comparisons can include conditional logic (e.g., Boolean logic, if/then/else logic, etc.) mapping a plurality of comparison outcomes to a plurality of corresponding quantum hardware 18, 24, 30, 50 routings. A comparison outcome can include, for example, a plurality of comparison values (e.g., Boolean values, difference values, etc.) indicative of whether a plurality of data values (e.g., system stress values, resource usage values, sensitivity values, etc.) are over or under a corresponding threshold. As a non-limiting illustrative example, a mapping from a plurality of comparison outcomes to a plurality of corresponding routings can include a mapping that routes to first quantum hardware 18 whenever a heat value is above a heat threshold; and, if the heat value is below the heat threshold, routes to first quantum hardware 18 if and only if two or more of a noise threshold, error risk threshold, decoherence risk threshold, qubit sensitivity threshold, and gate sensitivity threshold are exceeded. Other examples are possible.

In some instances, a code space allocation rule can include a comparison between a combined threshold (e.g., score threshold 64-4) and a plurality of corresponding data values. For example, in some instances, a plurality of data values (e.g., system stress values, resource usage values, sensitivity values, etc.) can be combined (e.g., numerically combined) to generate a combined score (e.g., numerical score, system stress score, routing score, etc.). As an example, increased system stress values or increased sensitivity values may increase a combined numerical score, while current resource usage values may decrease a combined numerical score. For example, a scoring system may be configured to encourage routing to first quantum hardware 18 when resources are available and error risk is high, while encouraging routing to lower-resource-usage second quantum hardware 24 when resource usage is high or error risk is low. Other implementations are possible. In some instances, a combined score can include one or more cost values, such as a cost (e.g., operating cost, migration cost, etc.) associated with routing to particular quantum hardware 18, 24, 30, 50. In some instances, numerically combining a plurality of data values can include additive combination (e.g., weighted additive combination), multiplicative combination, polynomial combination, or the like. For example, in some instances, numerically combining a plurality of data values can include multiplying each data value by a corresponding weight value, and adding the weighted values together to determine a combined score.

In some instances, a system stress threshold 64-1 can include a combined system stress threshold associated with a combination of multiple system stress values (e.g., heat, noise, error, decoherence, T1/T2 relaxation values, etc.), and applying a code space allocation rule 64 can include comparing a combined system stress threshold to a combined score determined based on a plurality of system stress values. In some instances, the combined score can include a machine-learned combined score, such as a machine-learned estimate of a risk of quantum error. For example, a quantum computing device 12 can input, to a machine-learned model that has been trained on input/output pairs comprising inputs comprising a plurality of system stress values and outputs comprising one or more values indicative of an error rate, system stress data (e.g., data received from one or more risk monitoring services 26). Continuing the example, the quantum computing device 12 can receive, as output from the machine-learned model, an estimated risk of quantum error associated with the input system stress data.

Similarly, a resource usage threshold 64-3 can include a combined resource usage threshold to be compared with a combination (e.g., additive combination, weighted additive combination, etc.) of resource usage values. An example combined resource usage value can include a total percentage of code space qubits 20, 58-1 currently in use or currently available; a total amount of electricity being used by a quantum computing device 12; a total percentage of another hardware resource (e.g., communication channel 36; quantum hardware 18, 24, 30, 50; etc.) currently in use or currently available; or other combined value. Additionally, a sensitivity threshold 64-2 can include a combined sensitivity threshold to be compared with a combination of a plurality of sensitivity values. An example combined sensitivity value can include, for example, a mean or median qubit sensitivity or average gate sensitivity over a plurality of qubits or gates; minimum, maximum, or percentile sensitivity value over a plurality of qubits or gates; or other combined value.

In some instances, numerically combining a plurality of data values can include machine-learned combination. For example, in some instances, a machine-learned model can be trained to output a numerical value, such as an estimated risk of quantum error, based on a plurality of inputs, such as system stress inputs, qubit or gate sensitivity inputs, resource usage inputs, and the like. In some instances, numerically combining a plurality of data values can include inputting the plurality of data values into the trained machine-learned model and receiving a combined score output from the machine-learned model. The machine-learned output can then be compared to a combined score threshold 64-4, and all or part of the first quantum process 16 can be routed based on the combined score.

In some instances, a code space allocation rule 64 can include a plurality of thresholds of the same type, such as a plurality of heat thresholds, a plurality of combined score thresholds 64-4, or the like. For example, in some instances, a quantum computing system 10 may have more than two quantum hardware options 18, 24, 30, 50 to choose from. In such instances, routing based on a plurality of thresholds of the same type can include routing to a highest-fidelity quantum hardware option if a highest threshold is exceeded; routing to a second-highest-fidelity quantum hardware option if a second-highest threshold is exceeded but a highest threshold is not; routing to a lowest-fidelity quantum hardware option if none of a plurality of thresholds is exceeded; and the like.

In some instances, routing a second temporal subset 62 can include migrating, based on updated system stress data received from the risk monitoring services 26 (e.g., responsive to a change in system stress levels, based on system stress data collected at a second time later than a first time in which system stress data for routing a first temporal subset 60 was collected, etc.), all or part of the first quantum computing process 16 to new quantum hardware 18, 24, 30, 50. For example, in some instances, the first quantum computing device 12 can migrate, responsive to an increase in system stress, all or part of the first quantum computing process 16 from lower-fidelity quantum hardware (e.g., second hardware 24, qubits 56, etc.) to higher-fidelity quantum hardware (e.g., first quantum hardware 18, qubits 20, etc.). As another example, in some instances, the first quantum computing device 12 can migrate, responsive to a decrease in system stress, all or part of the first quantum computing process 16 from resource-intensive higher-fidelity hardware (e.g., first quantum hardware 18, qubits 20, code space 22 hardware, etc.) to less resource-intensive hardware (e.g., second quantum hardware 24, qubits 56, etc.).

In some instances, migrating between higher-fidelity and lower-fidelity hardware can include migrating between first quantum hardware 18 that implements a quantum code space 22 and second quantum hardware 24 that does not implement a quantum code space. However, other configurations are possible. For example, in some instances, migrating between higher-fidelity and lower-fidelity hardware can include migrating between higher-fidelity and lower-fidelity code spaces, such as migrating between a first code space 22 and a second code space 58 associated with third quantum hardware 30 (e.g., between qubits 20 of the first code space 22 and qubits 58-1 of the third code space 58, etc.).

In some instances, migrating between higher-fidelity and lower-fidelity hardware can include migrating between first quantum hardware 18 and second quantum hardware 24 in the same quantum computing device 12. However, in some instances, migrating between higher-fidelity and lower-fidelity hardware can include migrating to or from fourth quantum hardware 50 associated with a second quantum computing device 14 different from the first quantum computing device 12.

In some instances, migrating the first quantum process 16 from second quantum hardware 24 to first quantum hardware 18 can include pausing the first quantum process 16 in the second quantum hardware 24. In some instances, migrating the first quantum process 16 from second quantum hardware 24 to first quantum hardware 18 can include transferring one or more quantum states from one or more qubits 56 of the second quantum hardware 24 to one or more qubits 20 of the first code space 22 or first quantum hardware 18. In some instances, migrating the first quantum process 16 from second quantum hardware 24 to first quantum hardware 18 can include resuming the first quantum process 16 in the first quantum hardware. Migrations between other pairs of source quantum hardware and destination quantum hardware can be performed in any manner described herein with respect to migrations from second quantum hardware 24 to first quantum hardware 18.

In some instances, migrating the first quantum process 16 can include communicating over one or more communication channels 36. For example, in some instances, transferring a quantum state from one or more qubits 56 to one or more qubits 20 can include communicating the quantum state over a quantum communication channel 36-2. As another example, in some instances, resuming a first quantum process 16 on second quantum hardware 24 can include communicating an execution state 68 (e.g., via a classical communication channel 36-1) to the first quantum hardware 18 or other hardware (e.g., classical components 32, control hardware, etc.) associated with the first quantum hardware 18; and resuming, by the first quantum hardware 18 based at least in part on the execution state 68, the first quantum process 16.

In some instances, pausing a first quantum process 16 can include storing (e.g., in memory 70, etc.), by the quantum computing system 10, execution state data 68 indicative of a current execution state of the first quantum process. In some instances, the execution state data 68 can include next gate data 72 indicative of one or more quantum gates to be performed next. In some instances, the execution state data 68 can include initialization data 74 indicative of a current state of the first quantum process 16 (e.g., current quantum state of one or more qubits associated with the first quantum process 16, etc.) or indicative of one or more initialization operations to be performed to arrive at the current state. As a non-limiting illustrative example, initialization data 74 can include one or more operations to configure an initial quantum state of one or more qubits. In some instances, first quantum hardware 18 can initialize a quantum state one or more qubits 20 based at least in part on initialization data 74 (e.g., instead of or in addition to transferring a quantum state from one or more qubits 56 to one or more qubits 20, which can be different from the qubits 20 being initialized based on initialization data 74).

In some instances, resuming a first process 16 can include retrieving execution state data 68 (e.g., from memory, from an execution state data structure such as a database, file, memory page, object, or the like); initializing a state of the first quantum process 16 (e.g., based on the execution state data 68, based on a quantum state of one or more qubits 56, etc.); retrieving, from a next gate 72 data structure, data indicative of one or more quantum gates to be performed next; and performing the one or more quantum gates to be performed next.

In some instances, migrating a first quantum process 16 can include interacting with one or more services 40, such as a qubit registry service 46, task manager service 48, scheduler service, or other service 40. In some instances, a qubit registry service 46 can include a service 40 that tracks various kinds of qubit metadata 76, such as data indicative of which qubits 20, 52, 56, 58-1 of a quantum computing system 10 are currently in use; which qubits are available; which qubits are in a known quantum state (e.g., superposition state, entanglement state, basis state, etc.); and other qubit metadata 76 (e.g., qubit type data; qubit stress data such as heat, noise, etc.; qubit fidelity data; etc.). In some instances, a qubit registry service 46 can include a service 40 that manages a qubit registry data structure 78 comprising qubit metadata 76. In some instances, the qubit registry data structure 78 can include qubit availability data 80 indicative of qubits that are currently available. In some instances, the qubit registry data structure can include qubit reservation data records 82 indicative of qubits that have been allocated to, or are currently being used by, a particular quantum process 16, 42.

In some instances, migrating the first quantum process 16 from second quantum hardware 24 to first quantum hardware 18 can include requesting, by a code space administration service 44 from a qubit registry service 46, data (e.g., qubit metadata 76, etc.) indicative of one or more qubits that are currently available on the first quantum hardware 18. For example, in some instances, a code space administration service 44 can determine a number of qubits 20 that are needed to perform the migration. In some instances, a quantum computing device 12 can analyze (e.g., parse, performing static code analysis, machine-learned code analysis, etc.) a quantum code file 54 to determine the number of qubits 20 needed for the migration. In some instances, migrating the first quantum process 16 from second quantum hardware 24 to first quantum hardware 18 can include sending, by the code space administration service 44 to the qubit registry service 46, a reservation request to reserve one or more qubits 20 to be used by the first quantum process 16. In some instances, a reservation request can include data indicative of a number of qubits 20 to be reserved; identifier data indicative of the identity of particular qubits 20 to be reserved; or other request data.

In some instances, a quantum computing device 12 or component thereof (e.g., code space administration service 44, qubit registry 46, etc.) can retrieve, from a qubit registry data structure 78, one or more available qubit data records 80 comprising data that identifies qubits 20 that are currently available to be used in a quantum computation. Qubits 20 that are currently available can include, for example, qubits that are not allocated to any executing process 38; qubits 20 that are not reserved, locked, or otherwise subject to access control restrictions; qubits 20 that can be safely used in a first quantum process 16 without causing interference (e.g., due to crosstalk, heat, noise, etc.) with another quantum process 38; or qubits 20 that are otherwise considered available. In some instances, migration can include retrieving, by a qubit registry service 46 responsive to a request from the code space administration service 44, one or more available qubit data records 80 identifying qubits 20 that are available for migrating the first quantum process 16 to the first quantum hardware 18; and providing, by the qubit registry service 46 to the code space administration service 44, the available qubit data records 80 or other data indicative of the available qubits 20.

In some instances, a quantum computing device 12 or component thereof (e.g., code space administration service 44, qubit registry service 46, etc.) can write, to a qubit registry data structure 78, one or more reservation data records 82 (e.g., rows, columns, cells, objects, files, etc.) reserving (e.g., allocating, locking, restricting access to, etc.) one or more qubits 20 for the first quantum process 16. In some instances, writing can include updating, editing, or the like. For example, in some instances, a quantum computing device 12 or component thereof (e.g., code space administration service 44, qubit registry service 46, etc.) can identify one or more available qubit data records 80 identifying one or more qubits 20 that are available for migration of the first quantum process 16; and can reserve the qubits 20 by updating each of the one or more available qubit data records 80 with data allocating the available qubits 20 to the first quantum process 16, such that the available qubit data records 80 are converted to reserved qubit data records 82. In some instances, migration can include writing, by a qubit registry service 46 responsive to receiving a reservation request from a code space administration service 44, data reserving one or more qubits 20 (e.g., qubits 20 of a quantum code space 22) to be used by the first quantum process 16 after migration.

In some instances, migrating the first quantum process 16 between quantum hardware 18, 24, 30, 50 can include retrieving, by the quantum computing device 12 (e.g., by a qubit registry service 46 responsive to a request from a code space administration service 44, etc.), qubit metadata 76 identifying qubits 56 that are currently in use by the first quantum process 16, along with qubit metadata 76 identifying qubits 20 to be used by the first quantum process 16 after migration. For example, in some instances, migration can include retrieving, by the quantum computing device 12 (e.g., by a qubit registry service 46 responsive to a request from a code space administration service 44, etc.), one or more qubit reservation data records 82 identifying qubits 56 of the second hardware 24 (e.g., the hardware being migrated from) that are currently in use by the first quantum process 16; retrieving, by the quantum computing device 12 (e.g., by a qubit registry service 46 responsive to a request from a code space administration service 44, etc.), one or more available qubit data records 80 indicative of qubits 20 of the first quantum hardware 18 (e.g., the hardware being migrated to) that are available for use in the first quantum process 16 after migration; updating, by the quantum computing device 12 (e.g., by a qubit registry service 46 responsive to a request from a code space administration service 44, etc.), the one or more available qubit data records 80 to allocate the corresponding qubits 20 to the first quantum process 16; and transferring, by the quantum computing device 12, a quantum state from the source qubits identified in the qubit reservation data records 82 (e.g., qubits 56) to the destination qubits (e.g., qubits 20) identified in the available qubit data records 80. In some instances, migrating can further include updating, by the quantum computing device 12, one or more qubit reservation data records 82 associated with the source hardware (i.e., the hardware being migrated from, such as second hardware 24) to release the qubit reservations, such that the qubits are identified in the qubit registry data structure 78 as available qubits that are available to be used in other quantum processes 38.

In some instances, migrating a first quantum process 16 to a quantum code space 22, 58 can include initiating (e.g., creating, starting up, powering up, generating, initializing, launching, opening, etc.) the quantum code space 22, 58. In some instances, migrating a first quantum process 16 from quantum code space 22, 58 can include closing (e.g., terminating, powering down, shutting down, etc.) or pausing (e.g., suspending execution of, placing on standby, placing in sleep mode) the code space 22, 58. For example, in some instances, a resource-intensive code space 22, 58 or qubits 20, 58-1 thereof can be placed in a low-resource-usage standby mode (e.g., sleep mode, powered down or "off" state, etc.) when not in use. In such instances, migrating a first quantum process 16 to the code space 22, 58 can include terminating the standby mode or placing the code space 22, 58 or qubits 20, 58-1 in an operating mode.

In some instances, first quantum hardware 18 can include hardware implementing a fixed (e.g., hard-wired, hard-coded, etc.) quantum code space 22, or can include flexible hardware having a higher-fidelity code space mode and a lower-fidelity operational mode. A code space mode can include, for example, a mode in which one or more error-reduction or noise-reduction operations are performed; a mode in which error-reduction or noise-reduction hardware is activated or used in an error-reduction or noise-reduction mode; or other mode associated with reduced error rates in exchange for increased resource usage (e.g., usage per qubit 20, per quantum gate, etc.).

In some instances, first quantum hardware 18 can include one or more multi-purpose components (e.g., quantum mechanical components, "physical" qubits, etc.) capable of performing error-reduction or noise-reduction functions in a code space mode and capable of performing other functions (e.g., acting as qubits, communication channels, control devices, readout devices, etc.) or no function (e.g., in a reduced-resource-usage mode) in other modes. For example, in some instances, quantum hardware 18, 24 can include a plurality of quantum mechanical components (e.g., physical qubit circuits, etc.) capable of acting as lower-fidelity non-code-space qubits in a lower-fidelity mode, and capable of performing error reduction functions for a corresponding (e.g., neighboring, etc.) qubit 20 in a code space mode. For example, in some instances, quantum hardware 18, 24 can include a non-code-space mode wherein a plurality of qubit 56 circuits are used to represent one logical qubit per physical qubit 56 circuit, and a code space mode wherein each higher-fidelity qubit 20 circuit comprises a plurality of physical qubit 56 circuits used to represent a single logical qubit at an increased fidelity and reduced error rate. In some instances, a code space mode can include a mode implementing an error correction code (e.g., repetition code, surface code, etc.), such as an error correction code that uses a plurality of physical qubits to encode one logical qubit. In some instances, migrating to or from a quantum code space 22, 58 can include initiating or terminating a code space mode of quantum hardware 18, 30 implementing the code space 22, 58.

In addition to migrating, routing portions of a first quantum process 16 can include other actions, such as executing a predetermined routing; restarting a first quantum process 16 in different quantum hardware 18, 24, 30, 50 responsive to a change in system stress data; or the like.

In addition to risk data received from risk monitoring services 26, a quantum computing device 12 can in some instances route based on qubit-specific or gate-specific sensitivity data 28, which can identify which qubits or quantum operations may be particularly vulnerable to errors.

Sensitivity data 28 can include, for example, data identifying which physical hardware (e.g., qubit hardware, gate hardware, etc.) is most vulnerable to specific kinds of system stress that are monitored by the risk monitoring services 26; data identifying a relationship between a risk of gate-level error or qubit-level error and a corresponding risk of error in a final output of a quantum computation; or other sensitivity data.

In some instances, sensitivity data 28 can include qubit-specific sensitivity data 28-1 comprising sensitivity data 28 associated with specific qubits or groups of qubits. In some instances, qubit-specific sensitivity data 28-1 can include data associated with specific qubit devices 20, 52, 56, 58-1 or groups thereof, such as data identifying which qubit devices 20, 52, 56, 58-1 are particularly vulnerable to various kinds of system stress (e.g., heat, noise, error, decoherence, T1 or T2 relaxation, etc.). In some instances, qubit-specific sensitivity data 28-1 can include sensitivity data 28 associated with a quantum computing program (e.g., computation or algorithm stored in a quantum code file 54, etc.). For example, in some instances, quantum computing code can include code defining a plurality of operations (e.g., quantum gates, etc.) to be performed on a plurality of qubits. In some instances, the quantum computing code can be programmed at a level of abstraction wherein the qubits described in the quantum code file 54 have not been mapped to specific qubit device hardware, such as specific qubits 20, 52, 56, 58-1. For example, each qubit (e.g., qubit variable, etc.) associated with a quantum code file may be identified by an identifier (e.g., variable name, identification number, etc.) that may be unrelated to specific qubit device hardware. In such instances, qubit-specific sensitivity data 28 can include qubit-specific data indicative of a relationship between a risk of quantum error (e.g., qubit error) in a particular qubit variable of a quantum code file and a risk of error in a final output of a quantum computation.

In some instances, sensitivity data 28 can include gate-specific sensitivity data 28-1 comprising sensitivity associated with specific quantum gates or categories of quantum gates. In some instances, gate-specific sensitivity data 28-2 can include sensitivity data 28 associated with particular quantum gating devices or quantum control devices, such as data indicating which quantum gating devices may be particularly vulnerable to which types of system stress (e.g., heat, noise, etc.). In some instances, gate-specific sensitivity data 28-2 can include sensitivity data 28 associated with quantum computing code (e.g., stored in a quantum code file 54), such as gate-specific data indicative of a relationship between a risk of quantum error (e.g., gate error) in a particular gating operation described in the quantum code file and a corresponding risk of output error in a final output of a quantum computation described in the quantum code file.

In some instances, a first portion (e.g., first qubit subset 84) of a first quantum process 16 can be routed to first quantum hardware 18 based at least in part on sensitivity data 28, and a second portion (e.g., second qubit subset 86, etc.) of a first quantum process 16 can be routed to second quantum hardware 24 based at least in part on the sensitivity data 28.

For example, in some instances, one or more code space allocation rules 64 can be applied based at least in part on the sensitivity data 28. In some instances, applying a code space allocation rule 64 to sensitivity data 28 can include comparing one or more qubit-specific or gate-specific sensitivity values 28-1, 28-2 to one or more sensitivity thresholds 64-2. In some instances, applying the code space allocation rule 64 can include routing each qubit or quantum gate described in a quantum code file 54 to a qubit 20, 56 based on the sensitivity threshold 64-2. For example, applying a sensitivity threshold 64-2 can include routing each qubit having a qubit-specific sensitivity 28-1 that exceeds a qubit sensitivity threshold 64-2 to first quantum hardware 18 implementing a code space 22 (e.g., to a corresponding qubit 20); routing each qubit associated with a quantum gate having a gate-specific sensitivity 28-2 that exceeds a gate sensitivity threshold 64-2 to the code space 22; and routing each qubit that does not exceed a qubit or gate sensitivity threshold 64-2 to quantum hardware 24, 50 (e.g., qubits 56, 52) that does not implement a quantum code space or third quantum hardware 30 that implements a lower-fidelity or less resource-intensive quantum code space 58 compared to the code space 22 of the first quantum hardware 18.

In some instances, routing qubit subsets 84, 86 can include one or more qubit registry operations. For example, a code space administration service 44 can send a qubit allocation request, or a request to identify one or more available qubits, to a qubit registry service 46; and the qubit registry service 46 can retrieve, write, update, or otherwise manipulate, responsive to receiving the request, one or more data entries of a qubit registry data structure 78. For example, in some instances, the qubit registry service 46 can retrieve one or more available qubit data entries 80 identifying one or more available qubits associated with quantum hardware 18, 24 to which a qubit subset 84, 86 is being routed. In some instances, the qubit registry service 46 can write or update one or more reserved qubit data entries 82 to indicate that the available qubits 20, 56 are now allocated to the first quantum process 16. In some instances, the qubit registry service 46 can provide qubit metadata 76 to the code space administration service 44 or other service 40 (e.g., scheduler service, qubit controller service, etc.) identifying the qubits 20, 56 that have been allocated to implement the qubit subsets 84, 86 associated with the quantum code file 54. In some instances, routing qubit subsets 84, 86 can include any qubit registry operation described above with respect to routing (e.g., migrating, etc.) temporal subsets 60, 62, and vice versa.

In some instances, routing qubit subsets 84, 86 can include one or more code analysis operations (e.g., static code analysis, parsing, machine-learned code analysis, etc.). For example, in some instances, routing qubit subsets 84, 86 can include performing one or more code analysis operations to separate (e.g., separately identify, route, schedule, etc.) operations (e.g., quantum gates, etc.) to be performed on qubits of a first qubit subset 84 from operations to be performed on qubits of a second qubit subset 86. In some instances, separating first-qubit-subset 84 and second-qubit-subset 86 operations can include generating separate quantum code files 54 (e.g., QASM files, machine code files, source code files, control code files, etc.) each describing a subset of operations of the first quantum process 16. For example, in some instances, a quantum computing device 12 can provide (e.g., via a classical communication channel 36-2, etc.), to first quantum hardware 18, data (e.g., a quantum code file 54, etc.) indicative of a first plurality of operations to be performed on the first qubit subset 84; and provide, to the second quantum hardware 24, data indicative of a second plurality of operations to be performed on the second qubit subset 86.

In some instances, routing subsets 60, 62, 84, 86 can include determining and performing one or more bridging operations to integrate one or more subsets of operations into an overall first quantum process 16. For example, in some instances, a first quantum process 16 may include one or more inter-subset operations (e.g., quantum gates, etc.) that may affect or rely on a first quantum state of one or more first qubits of a first subset 60, 84 and may further affect or rely on a second quantum state of one or more second qubits of a second subset 62, 86. In some instances, routing the subsets 60, 62, 84, 86 to corresponding quantum hardware 18, 24, 30 can include determining (e.g., via parsing, machine-learned determination, static code analysis, etc.) and performing one or more inter-hardware operations (e.g., communication operations, gating operations, entanglement operations, etc.) to implement the inter-subset operations.

In some instances, a code space allocation rule 64 can include one or more rules to minimize or reduce a number or cost of inter-subset operations that may be needed to execute a first quantum process 16. For example, in some instances, a routing score associated with a score threshold 64-4 or resource usage value associated with a resource usage threshold 64-3 can include one or more values based on a number of inter-subset operations required to route a particular qubit or quantum gate to particular quantum hardware. For example, in some instances, a combined score (e.g., combined score combining system stress values, resource usage values, qubit sensitivity values, and the like) for a qubit can be adjusted downward if routing the qubit to second hardware 24 would require fewer inter-subset operations compared to routing the qubit to first hardware 18; adjusted upward if routing the qubit to second hardware 24 would require more inter-subset operations compared to routing the qubit to first hardware 18; or the like. In some instances, such routing can be performed according to a greedy heuristic, wherein a first qubit can be routed without regard to inter-subset operations, and further qubits can be routed based on a number of inter-subset operations required given the qubit routings that have already been determined.

In some instances, routing qubit subsets 84, 86 to quantum hardware 18, 24, 30, 50 can be based at least in part on system stress data. For example, in some instances, a code space allocation rule 64 can include a combined score threshold 64-4 associated with a score that depends in part on sensitivity data 28 and depends in part on system stress data (e.g., heat, noise, error, decoherence, T1/T2 relaxation, or other system stress data), such as a score comprising a combination (e.g., additive combination, weighted additive combination, multiplicative combination, polynomial combination, etc.) of sensitivity data 28 and system stress data. In some instances, system stress data can include system stress data determined by a risk monitoring service 26 at one or more times, such as immediately before routing of the qubit subsets 84, 86. In some instances, system stress data can include estimated system stress data, such as one or more estimated system stress values determined based on system stress data determined by a risk monitoring service 26 at one or more times, such as immediately before routing of the qubit subsets 84, 86. In some instances, an estimated system stress value can include an estimated value of one or more system stress variables at one or more future times (e.g., a plurality of future times), such as at a time when the first quantum process 16 is completed; a time halfway between when the first quantum process 16 is initiated and when the first quantum process 16 is completed; an estimated time of peak system stress; or the like.

In some instances, a first quantum process 16 can be divided both temporally and by qubit. For example, in some instances, a first temporal subset (e.g., subset of operations over a first time period, etc.) of a first qubit subset 84 may be implemented on first quantum hardware 18, and a second temporal subset of the first qubit subset 86 may be implemented on other quantum hardware 24, 30, 50. In some instances, routing of a first quantum process 16 based on both temporal and qubit-wise divisions can include determining an initial routing based at least in part on sensitivity data 28 and initial system stress data (e.g., based on estimated system stress data determined from initial system stress data, etc.). In some instances, routing of a first quantum process 16 based on both temporal and qubit-wise divisions can include periodically receiving updated system stress data from a risk monitoring service 26, and routing (e.g., migrating, determining whether to migrate, etc.) temporal subsets of the qubit subsets 84, 86 based at least in part on the updated system stress data. In some instances, routing of a first quantum process 16 based on both temporal and qubit-wise divisions can include determining an initial migration plan (e.g., instead of or in addition to receiving system stress updates from a risk monitoring service 26), wherein the initial migration plan may include implementing a first temporal subset of a qubit subset 84 on first quantum hardware 18, with a plan to implement a second temporal subset of the qubit subset 84 to other quantum hardware 24, 30, 50 (e.g., by migrating the qubit subset 84 at a predetermined time).

In some instances, routing subsets 60, 62, 84, 86 can include executing a predetermined routing, such as a predetermined routing indicated by an annotation stored in an annotated code file 66. For example, in some instances, an annotated code file 66 can comprise qubit annotations 88 or gate annotations 90. In some instances, the qubit annotations 88 or gate annotations 90 can include data indicative of a predetermined routing, such as data identifying a type or category of quantum hardware 18, 24, 30, 50 that a qubit, gate, qubit subset 84, 86, or group of gates should be routed to; data identifying particular quantum hardware 18, 24, 30, 50; or the like. A type or category of quantum hardware 18, 24, 30, 50 can include, for example, a type of quantum hardware architecture (e.g., instruction set architecture, hardware abstraction layer, qubit type, etc.), a fidelity threshold (e.g., minimum qubit fidelity, minimum gate fidelity, etc.), a resource usage threshold (e.g., maximum resource usage per qubit or gate, etc.), a combined score or cost/benefit threshold such as a threshold associated with a ratio of fidelity to resource usage, or other hardware category description. In some instances, qubit annotations 88 and gate annotations 90 can include other data, such as sensitivity data 28, code space allocation rule 64 data, or other relevant data associated with one or more qubits or quantum gates described in an annotated code file 66.

In some instances, one or more tests can be performed to determine one or more of sensitivity data, resource usage data, system stress estimation data, code annotation data (e.g., predetermined routings, etc.), or the like. For example, in some instances, a quantum computing device 12 can execute a quantum computation using a second quantum process 42-1, such as a second quantum process 42-1 executing in the first quantum hardware 18. In some instances, the quantum computing device 12 can execute the same quantum computation using a third quantum process 42-2, such as a third quantum process 42-2 executing in quantum hardware 24, 30, 50 different from the quantum hardware used to execute the second quantum process 42-1. In some instances, the quantum computing device 12 can collect test data associated with the second and third quantum processes 42-1, 42-2. In some instances, the quantum computing device 12 can use the test data to perform various functions, such as generating an annotated code file 66 or otherwise storing test data or data determined based on test data; revising a quantum code file 54 to reduce a risk of quantum error; or other operation.

In some instances, a quantum computing device 12 can collect and store sensitivity data 28 based on one or more test executions of a quantum algorithm (e.g., executions of a quantum code file 54, etc.). For example, in some instances, the quantum computing device 12 can execute a quantum algorithm one or more times (e.g., a plurality of times) on each of one or more quantum hardware 18, 24, 30, 50 devices. In some instances, the quantum computing device 12 can collect system stress data (e.g., heat, noise, error, decoherence, T1/T2 relaxation, or other system stress data) during each execution. In some instances, the quantum computing device 12 can collect error data indicative of one or more errors associated with one or more qubits 20, 52, 56, 58-1 or one or more quantum gates. In some instances, the quantum computing device 12 can collect error data indicative of one or more errors associated with an output (e.g., final output, etc.) of each test execution. In some instances, the quantum computing device 12 can compute and store sensitivity data 28 based on the collected data, such as qubit-specific sensitivity data 28-1 indicative of a relationship between one or more system stress variables and a risk of error in the qubit; qubit-specific sensitivity data 28-1 indicative of a relationship between a risk of error in the qubit and a corresponding risk of error in an output of a quantum computation; gate-specific sensitivity data 28-1 indicative of a relationship between one or more system stress variables and a risk of error in a quantum gate; gate-specific sensitivity data 28-1 indicative of a relationship between a risk of error in the gate and a corresponding risk of error in an output of a quantum computation; or other sensitivity data 28. In some instances, the quantum computing device 12 can store sensitivity data 28 in an annotated code file 66, in a standalone sensitivity data structure (e.g., database, file, data table, column, row, object of a NoSQL database, object of an object-oriented programming language, struct, etc.), or in another data structure.

In some instances, a quantum computing device 12 can collect and store system stress data based on one or more test executions of a quantum algorithm (e.g., executions of a quantum code file 54, etc.). For example, in some instances, one or more quantum computing devices 12, 14 can receive system stress data from one or more risk monitoring services 26 during each of one or more executions on each of one or more quantum hardware 18, 24, 30, 50 devices. In some instances, the quantum computing device(s) 12, 14 can store raw system stress data (e.g., in a storage device 92, in a data structure for storing system stress test data, etc.), or can process the system stress data to generate and store processed system stress data. In some instances, processed system stress data can include data for estimating an expected system stress associated with executing a quantum process (e.g., tested or untested quantum process) on quantum hardware 18, 24, 30, 50. In some instances, processed system stress data can include regression data (e.g., statistical regression data, linear regression data, polynomial regression data) for estimating one or more expected system stress values based on one or more input values (e.g., initial system stress values; quantum process properties such as qubit count, gate count, or the like; quantum process identifiers; quantum hardware properties such as hardware type, code space type, qubit type, or the like; quantum hardware identifiers; etc.). In some instances, processing raw system stress data can include performing statistical regression. In some instances, processing raw system stress data can include training a machine-learned model using input-output pairs, wherein each input-output pair can include an input comprising collected test data (e.g., initial system stress data, quantum process data, etc.) and an output comprising collected test data (e.g., system stress values during execution of a quantum process 42-1, 42-2, etc.). In this manner, for instance, a machine-learned model can be trained to estimate an expected system stress value based on one or more input values (e.g., initial system stress values; quantum process properties such as qubit count, gate count, or the like; quantum process identifiers; quantum hardware properties such as hardware type, code space type, qubit type, or the like; quantum hardware identifiers; etc.).

In some instances, a quantum computing device 12 can collect and store resource usage data based on one or more test executions of a quantum algorithm (e.g., executions of a quantum code file 54, etc.). For example, a quantum computing device 12, 14 can receive resource usage data from a quantum task manager 48 or other component of a quantum computing device 12. In some instances, the resource usage data can be stored raw or can be processed and stored as processed data. In some instances, raw or processed data can be used to estimate resource usage amounts of one or more quantum processes 16, 42-1, 42-2 or quantum process routings (e.g., resource usage amounts of a plurality of tested or untested quantum operations executing on tested or untested quantum hardware 18, 24, 30, 50, etc.). In some instances, raw or processed resource usage data can have any format described above with respect to raw or processed system stress data; can be processed in any manner described above with respect to system stress data; or can otherwise share any property described herein with respect to system stress data.

In some instances, a quantum computing device 12 can collect and store predetermined routing data based on one or more test executions of a quantum algorithm (e.g., executions of a quantum code file 54, etc.). For example, a quantum computing device 12 can collect, store, or process system stress data, sensitivity data, resource usage data, or other data associated with one or more test executions of a quantum computation (e.g., quantum computation defined by a quantum code file 54). In some instances, the quantum computing device 12 can process the collected test data to determine one or more routing plans for routing subsets (e.g., temporal subsets 60, 62, qubit subsets 84, 86, gate subsets, etc.) of the quantum computation to appropriate quantum hardware 18, 24, 30, 50. In some instances, the quantum computing device 12 can store the predetermined routing data in one or more data structures, such as in an annotated quantum code file 66. An annotated code file 66 can include, for example, the quantum code of a quantum code file 54 defining the quantum computation, along with additional annotation data, such as annotation data describing one or more predetermined routings. For example, in some instances, an annotated code file 66 can include qubit annotation data 88 describing a routing of one or more qubits described in a quantum code file 54 to one or more qubit devices 20, 52, 56, 58-1 for implementing the qubits. As another example, in some instances, an annotated code file 66 can include gate annotation data 90 describing a routing of one or more quantum gates described in a quantum code file 54 to one or more quantum hardware 18, 24, 30, 50 devices to implement the quantum gates.

A quantum computing device 12 can store test data in any appropriate manner and in any appropriate location, such as in memory 70; a storage device 92, 34-4; in an annotated code file 66; in one or more data structures; or the like.

In some instances, a quantum computing system 10 can revise one or more quantum code files 54. For example, in some instances, a quantum computing system 10 can revise one or more quantum code files 54 based on test data generated in test executions of the quantum code file 54. In some instances, a quantum computing system 10 can revise one or more quantum code files 54 using a machine-learned model 94 (e.g., machine-learned language model, machine-learned code generation model, pretrained model, fine-tuned model, etc.).

In some instances, revising a quantum code file 54 can include inputting, to a machine-learned model 94, first code 96 to be revised and other input data (e.g., test data indicative of one or more risks of error in the first code; instruction content or other input context generated based on the test data; etc.); and receiving, from the machine-learned model 94, revised quantum code 98. In some instances, revising a quantum code file 54 can include providing additional input context to the machine-learned model 94, such as instruction content (e.g., instructions describing a revision task), system prompt data, few-shot prompt data, chain-of-thought prompt data, or other input context. In some instances, few-shot prompt data can include a plurality of example input-output pairs comprising an example input and corresponding example output associated with the example input. An example input can include, for example, example first-code 96 inputs, example test data inputs (e.g., system stress data, sensitivity data, resource usage data, etc.), or other quantum code revision inputs. In some instances, revising a quantum code file 54 can include inputting a subset of the first code 96 to the machine-learned model 94 and receiving a revised subset as output from the machine-learned model 94. In some instances, the subset can be selected based on test data, such as error data, sensitivity data, or the like. For example, in some instances, one or more high-cost qubits or gates can be identified based on the test data, such as qubits or gates associated with a high error rate or high sensitivity on all quantum hardware 18, 24, 30, 55 options; qubits or gates that may be costly (e.g., in terms of resource usage, communication costs between quantum process subsets 60, 62, 84, 86, etc.) to route to low-error-rate hardware; or other qubits or gates of interest.

In some instances, revised code 98 can be further tested (e.g., on each of a plurality of quantum hardware 18, 24, 30, 50 options, etc.), and the further test data can be used in any manner described above (e.g., for routing; to further revise the revised code 98; etc.).

In some instances, a quantum computing system 10 or quantum computing device 12 can include one or more classical computing devices 34 or classical computing components 32. In some instances, classical computing devices 34 or components 32 can include one or more processor devices 34-1, 99; memory devices 34-1, 70, which may include a memory controller 34-3; storage devices 34-4, 92; display devices 34-5; or other classical computing components 32. In some instances, classical computing components 32 or classical computing devices 34 of a quantum computing system 10, or components thereof, can have any property described herein with respect to FIG. 4 and computing device 430. Additionally, classical communication channels 36-1 can have any property described herein with respect to FIG. 4 and internal or external communication channels (e.g., networks, system bus 446, etc.).

In some instances, any entity described herein as a "second," "third," or "fourth" entity or the like can have any property described herein with a similarly named "first" entity, and vice versa. For example, second, third, or fourth quantum hardware 24, 30, 50 or components thereof (e.g., qubits 56, second code space 58, etc.) can have any property described herein with respect to first quantum hardware 18 and components thereof, and vice versa. Similarly, second and third quantum processes 42-1, 42-2 can have any property described herein with respect to the first quantum process 16, and vice versa.

As used herein, the terms "process" and "service" can each refer to any executing process or operation on a quantum or classical component of a first quantum computing device 12. In some instances, the term "service" may be used to refer to an executing process (e.g., classical computing process) that may provide support, monitoring, scheduling, or the like for one or more other executing processes or operations (e.g. processes 38, such as quantum computations of interest). However, such usage is not intended to be limiting, and a "service" can in some instances include any executing operation (e.g., computation, software process, quantum operating system process, etc.).

Because the services 40 and processes 38 are components of the quantum computing device 12, functionality implemented by a service 40 or process 38 may be attributed to the quantum computing device 12 or quantum computing system 10 generally. Moreover, in examples where a service 40 or process 38 comprises software instructions that cause a processor device 99 to carry out functionality discussed herein, functionality implemented by the process 38 or service 40 can be attributed herein to the processor device 99.

It is further noted that while the code space administration service 44, qubit registry 46, task manager 48, and risk monitoring services 26 are shown as separate components, in other implementations, the services 40 could be implemented in a single component or could be implemented in any other number of components (e.g., greater than four, greater than eight, etc.).

Figure 2:
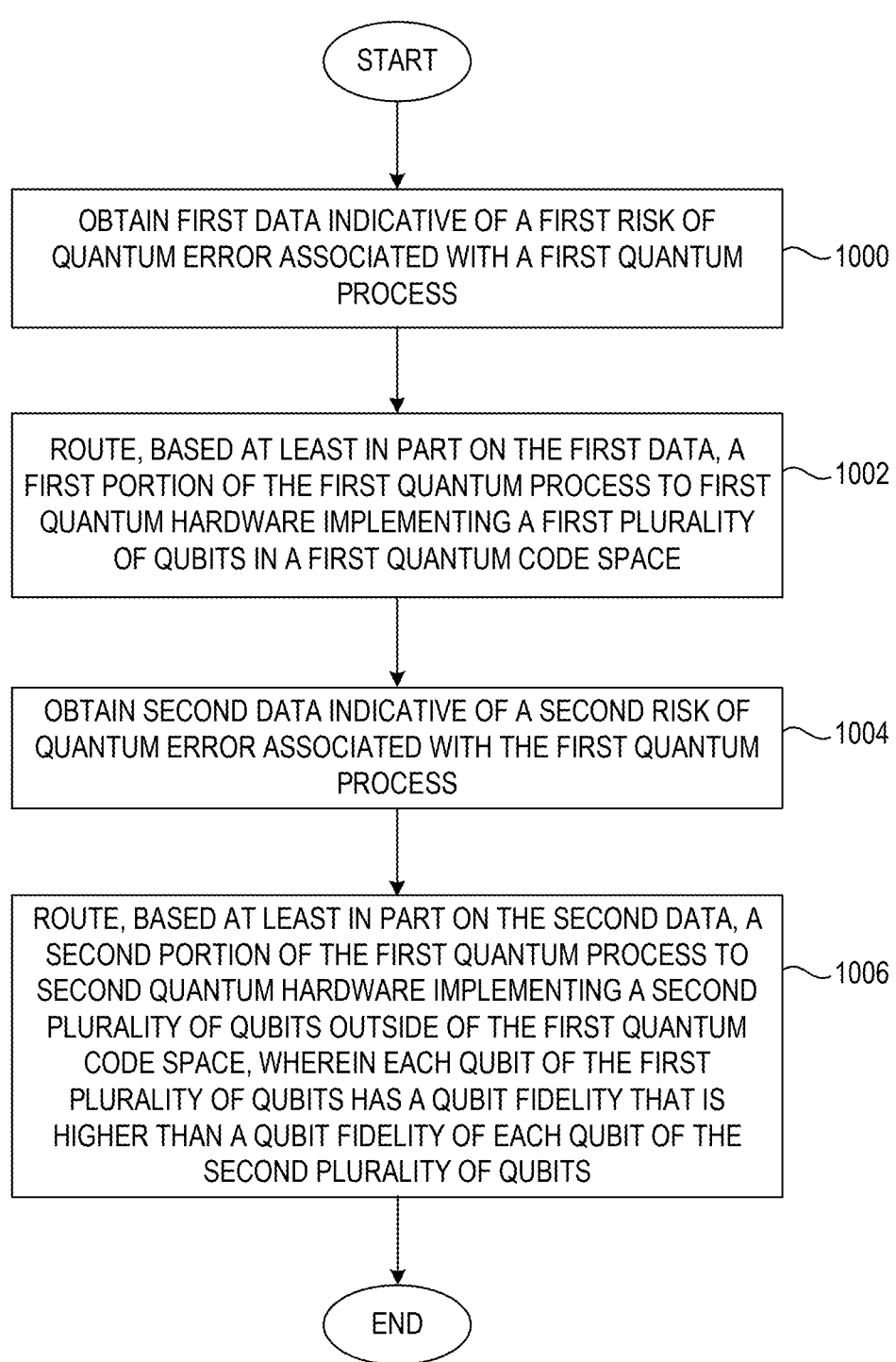
FIG. 2 is a flowchart diagram of a method for administering a quantum code space according to one example.

FIG. 2 is a flowchart diagram of a method for administering a quantum code space according to one example. The method of FIG. 2 can be performed, for example, by a quantum computing system 10.

At 1000, a quantum computing system 10 can obtain (e.g., receive, retrieve, generate, etc.) first data (e.g., system stress data received from a risk monitoring service 26, sensitivity data 28, etc.) indicative of a first risk of quantum error associated with a first quantum process (e.g., first quantum process 16, etc.). Obtaining the first data can include, for example, one or more activities described above with respect to FIG. 1.

At 1002, a quantum computing system 10 can route, based at least in part on the first data, a first portion (e.g., first qubit subset 84, first temporal subset 60, etc.) of the first quantum process to first quantum hardware (e.g., first quantum hardware 18) implementing a first plurality of qubits (e.g., qubits 20) in a first quantum code space (e.g., first quantum code space 22). Routing the first portion to the first quantum hardware can include, for example, one or more activities described above with respect to FIG. 1.

At 1004, a quantum computing system 10 can obtain (e.g., receive, retrieve, generate, etc.) second data (e.g., system stress data received from a risk monitoring service 26, sensitivity data 28, etc.) indicative of a second risk of quantum error associated with the first quantum computing process. Obtaining the second data can include, for example, one or more activities described above with respect to FIG. 1.

At 1006, the quantum computing system 10 can route, based at least in part on the second data, a second portion (e.g., second qubit subset 86, second temporal subset 62, etc.) of the first quantum process to second quantum hardware (e.g., second quantum hardware 24) implementing a second plurality of qubits (e.g., qubits 56) outside of the first quantum code space, wherein each qubit of the first plurality of qubits has a qubit fidelity that is higher than a qubit fidelity of each qubit of the second plurality of qubits. Routing the second portion to the second quantum hardware can include, for example, one or more activities described above with respect to FIG. 1.

Figure 3:
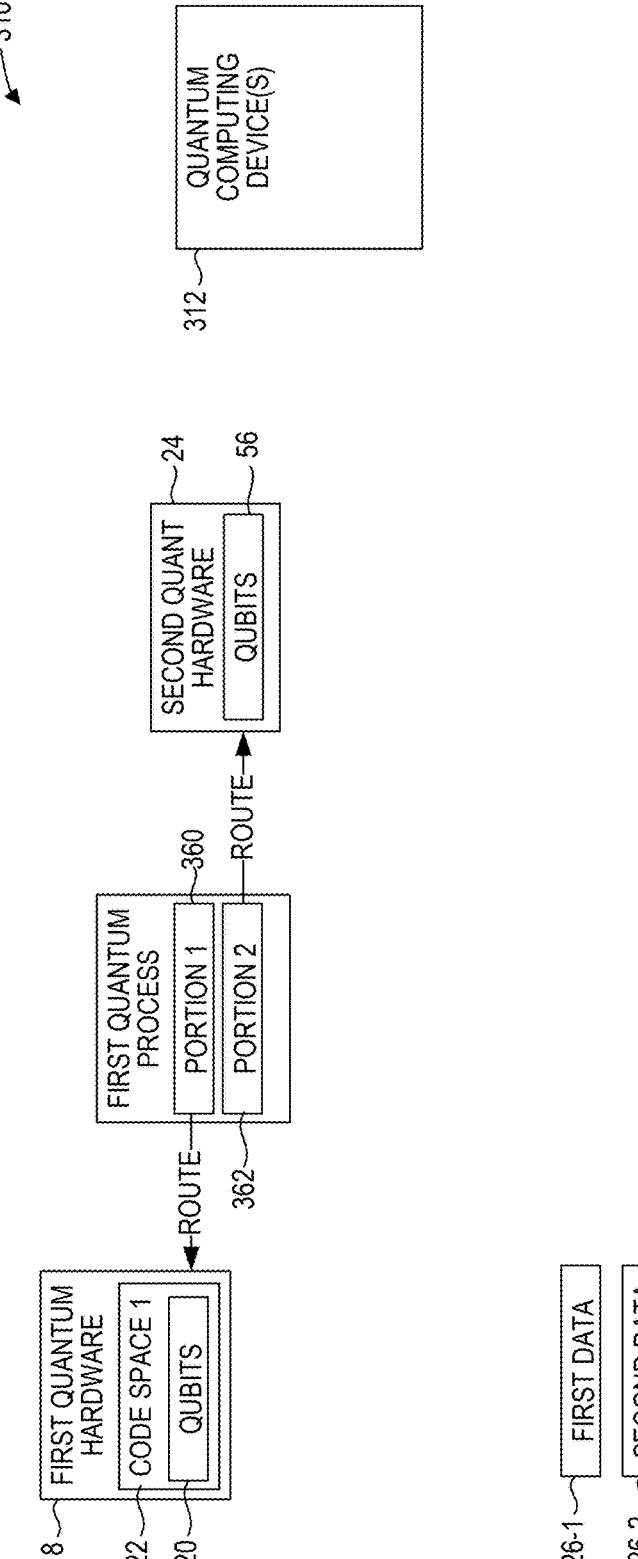
FIG. 3 is a simplified block diagram of the environment illustrated in FIG. 1 according to one implementation.

FIG. 3 is a simplified block diagram of the environment illustrated in FIG. 1 according to one implementation.

A quantum computing system 310 comprising one or more quantum computing devices 312 can obtain first data 326-1 indicative of a first risk of quantum error associated with a first quantum process 16. The quantum computing system 10 can route, based at least in part on the first data 326-1, a first portion 360 of the first quantum process 16 to first quantum hardware 18 implementing a first plurality of qubits 20 in a first quantum code space 22. The quantum computing system 10 can obtain second data 326-2 indicative of a second risk of quantum error associated with the first quantum process 16. The quantum computing system 10 can route, based at least in part on the second data 326-2, a second portion 362 of the first quantum process 16 to second quantum hardware 24 implementing a second plurality of qubits 56 outside of the first quantum code space 22. In some instances, each qubit of the first plurality of qubits 20 can have a qubit fidelity that is higher than a qubit fidelity of each qubit of the second plurality of qubits 56.

In some instances, a quantum computing system 310 or device 312 can be, comprise, be comprised by, or otherwise share one or more properties with a quantum computing system 10 or device 12. For example, in some instances, a quantum computing system 310 or device 312 can have any property described above with respect to a quantum computing system 10 or device 12, and vice versa.

In some instances, first or second data 326 can be, comprise, be comprised by, or have any property described herein with respect to one or more of: system stress data received from one or more risk monitoring services 26; sensitivity data 28; code annotation data 88, 90; or other data indicative of a risk of quantum error.

In some instances, first or second portions 360, 362 of a first quantum process 16 can be, comprise, be comprised by, or have any property described herein with respect to one or more of: qubit subsets 84, 86; temporal subsets 60, 62; or other process portions.

Figure 4:
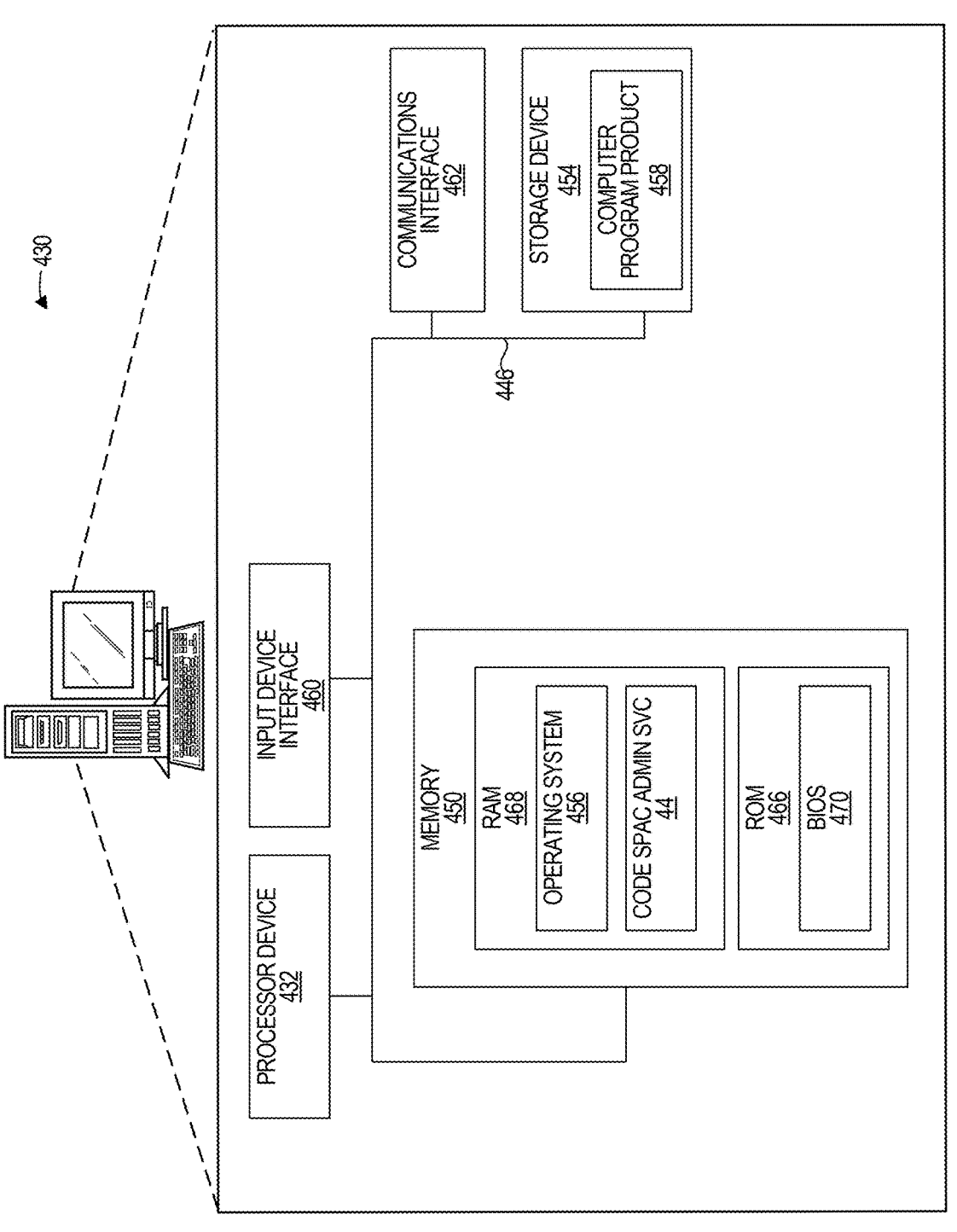
FIG. 4 is a block diagram of a computing device suitable for implementing examples according to one example.

FIG. 4 is a block diagram of the computing device 430 suitable for implementing examples according to one example. The computing device 430 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 430 includes the processor device 432, the system memory 450, and a system bus 446. The system bus 446 provides an interface for system components including, but not limited to, the system memory 450 and the processor device 432. The processor device 432 can be any commercially available or proprietary processor.

The system bus 446 may be any of several types of bus structures that may further interconnect to a memory bus (with or without a memory controller), a peripheral bus, and/or a local bus using any of a variety of commercially available bus architectures. The system memory 450 may include non-volatile memory 466 (e.g., read-only memory (ROM), erasable programmable read-only memory (EPROM), electrically erasable programmable read-only memory (EEPROM), etc.), and volatile memory 468 (e.g., random-access memory (RAM)). A basic input/output system (BIOS) 470 may be stored in the non-volatile memory 466 and can include the basic routines that help to transfer information between elements within the computing device 430. The volatile memory 468 may also include a high-speed RAM, such as static RAM, for caching data.

The computing device 430 may further include or be coupled to a non-transitory computer-readable storage medium such as the storage device 454, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 454 and other drives associated with computer-readable media and computer-usable media may provide non-volatile storage of data, data structures, computer-executable instructions, and the like.

A number of modules can be stored in the storage device 454 and in the volatile memory 468, including an operating system 456 and one or more program modules, such as the code space administration service 44 or risk monitoring service 26, which may implement the functionality described herein in whole or in part. All or a portion of the examples may be implemented as a computer program product 458 stored on a transitory or non-transitory computer-usable or computer-readable storage medium, such as the storage device 454, which includes complex programming instructions, such as complex computer-readable program code, to cause the processor device 432 to carry out the steps described herein. Thus, the computer-readable program code can comprise software instructions for implementing the functionality of the examples described herein when executed on the processor device 432. The processor device 432, may serve as a controller, or control system, for the computing device 430 that is to implement the functionality described herein.

An operator, such as a user, may also be able to enter one or more configuration commands through a keyboard (not illustrated), a pointing device such as a mouse (not illustrated), or a touch-sensitive surface such as a display device. Such input devices may be connected to the processor device 432 through an input device interface 460 that is coupled to the system bus 446 but can be connected by other interfaces such as a parallel port, an Institute of Electrical and Electronic Engineers (IEEE) 1394 serial port, a Universal Serial Bus (USB) port, an IR interface, and the like. The computing device 430 may also include the communications interface 462 suitable for communicating with a network as appropriate or desired. The computing device 430 may also include a video port configured to interface with a display device, to provide information to the user.

Individuals will recognize improvements and modifications to the preferred examples of the disclosure. All such improvements and modifications are considered within the scope of the concepts disclosed herein and the claims that follow.

What is claimed is:

1. A method comprising:

obtaining, by a quantum computing system comprising one or more quantum computing devices, first data indicative of a first risk of quantum error associated with a first quantum process;

routing, by the quantum computing system based at least in part on the first data, a first portion of the first quantum process to first quantum hardware implementing a first plurality of qubits in a first quantum code space;

obtaining, by the quantum computing system, second data indicative of a second risk of quantum error associated with the first quantum process; and routing, by the quantum computing system based at least in part on the second data, a second portion of the first quantum process to second quantum hardware implementing a second plurality of qubits outside of the first quantum code space, wherein each qubit of the first plurality of qubits has a qubit fidelity that is higher than a qubit fidelity of each qubit of the second plurality of qubits.

2. The method of claim 1, wherein:

the first data comprises data indicative of a first system stress of the second quantum hardware at a first time; and the second data comprises data indicative of a second system stress of the second quantum hardware at a second time.

3. The method of claim 2, wherein the first time is later than the second time, and routing the first portion comprises migrating, by the quantum computing system, the first quantum process from the second quantum hardware to the first quantum hardware.

4. The method of claim 3, wherein migrating the first quantum process comprises:

pausing, by the quantum computing system, the first quantum process in the second quantum hardware;

transferring, by the quantum computing system from one or more qubits of the second plurality of qubits to one or more qubits of the first plurality of qubits, one or more quantum states; and resuming, by the quantum computing system, the first quantum process in the first quantum hardware.

5. The method of claim 4, wherein:

pausing the first quantum process comprises storing, by the quantum computing system, data indicative of a current execution state of the first quantum process, wherein the current execution state is indicative of one or more quantum gates to be performed next; and resuming the first quantum process comprises:

initializing, by the quantum computing system, the first quantum process in the current execution state; and performing, by the quantum computing system on the one or more qubits of the first plurality of qubits, the one or more quantum gates to be performed next.

6. The method of claim 3, wherein migrating the first quantum process comprises:

retrieving, by the quantum computing system from a qubit registry comprising qubit metadata, data that identifies one or more qubits of the second plurality of qubits on which the first quantum process is executing;

retrieving, by the quantum computing system from the qubit registry, data that identifies one or more qubits of the first plurality of qubits that are currently available to be used; and transferring, by the quantum computing system, a quantum state from the one or more qubits of the second plurality of qubits to the one or more qubits of the first plurality of qubits.

7. The method of claim 6, wherein migrating the first quantum process further comprises:

updating, by the quantum computing system, the qubit registry to indicate that the one or more qubits of the first plurality of qubits are currently allocated to the first quantum process.

8. The method of claim 2, wherein routing the first portion comprises applying a code space allocation rule to the data indicative of the first system stress.

9. The method of claim 8, wherein the code space allocation rule comprises a system stress threshold, and applying the code space allocation rule comprises:

routing, by the quantum computing system responsive to determining that the first system stress is above the system stress threshold, one or more qubits of the first quantum process to the first quantum hardware.

10. The method of claim 2, wherein the second time is later than the first time, and routing the second portion comprises migrating, by the quantum computing system, the first quantum process from the first quantum hardware to the second quantum hardware.

11. The method of claim 2, wherein the first data and the second data each comprise one or more of heat data, noise data, error rate data, qubit decoherence data, T1 relaxation data, and T2 relaxation data.

12. The method of claim 2, wherein the first time is later than the second time, and routing the first portion comprises restarting, by the quantum computing system responsive to determining that the first system stress is above a system stress threshold, the first quantum process in the first quantum code space.

13. The method of claim 1, wherein the first data comprises at least one of:

qubit-specific data indicative of a relationship between a risk of qubit error in a first qubit and a first corresponding risk of output error in an output of the first quantum process; and gate-specific data indicative of a relationship between a risk of gate error in a first quantum gate and a second corresponding risk of output error in an output of the first quantum process.

14. The method of claim 13, further comprising:

executing, by the quantum computing system, a quantum computation using a second quantum process executing in the first quantum hardware;

executing, by the quantum computing system, the quantum computation using a third quantum process executing in the second quantum hardware; and determining, by the quantum computing system based on a comparison between the second quantum process and the third quantum process, third data comprising at least one of the qubit-specific data and the gate-specific data.

15. The method of claim 14, further comprising:

annotating, by the quantum computing system based on the third data, a quantum code file comprising quantum computing code associated with the quantum computation to generate an annotated quantum code file comprising one or more annotations; and routing the first portion comprises mapping, by the quantum computing system based at least in part on the one or more annotations, one or more qubits described in the quantum code file to one or more qubits of the first plurality of qubits.

16. The method of claim 1, further comprising:

executing, by the quantum computing system, a quantum computation using a second quantum process executing in the first quantum hardware;

executing, by the quantum computing system, the quantum computation using a third quantum process executing in the second quantum hardware;

generating, by the quantum computing system based on a comparison between the second quantum process and the third quantum process, risk data comprising at least one of:

qubit-specific data indicative of a relationship between a risk of qubit error in a first qubit and a first corresponding risk of output error in an output of the first quantum process; and gate-specific data indicative of a relationship between a risk of gate error in a first quantum gate and a second corresponding risk of output error in an output of the first quantum process;

inputting, by a classical computing system comprising one or more classical computing devices, a first input indicative of the risk data into a machine-learned model;

inputting, by the classical computing system, a second input indicative of first quantum computing code for performing the quantum computation into the machine-learned model; and generating, by the machine-learned model based at least in part on the first input and the second input, revised quantum computing code for performing the quantum computation.

17. A quantum computing system, comprising:

first quantum hardware implementing a first plurality of qubits in a first quantum code space;

second quantum hardware implementing a second plurality of qubits outside of the first quantum code space, wherein each qubit of the first plurality of qubits has a qubit fidelity that is higher than a qubit fidelity of each qubit of the second plurality of qubits; and one or more processor devices to:

route, based at least in part on first data indicative of a first risk of quantum error associated with a first quantum process, a first portion of the first quantum process to the first quantum hardware; and route, based at least in part on second data indicative of a second risk of quantum error associated with the first quantum process, a second portion of the first quantum process to the second quantum hardware.

18. The quantum computing system of claim 17, wherein:

the first data comprises data indicative of a first system stress of the second quantum hardware at a first time;

the second data comprises data indicative of a second system stress of the second quantum hardware at a second time; and routing the first portion comprises migrating, based at least in part on a change between the first system stress and the second system stress, the first quantum process to or from the first quantum hardware.

19. The quantum computing system of claim 17, wherein the first data comprises at least one of:

qubit-specific data indicative of a relationship between a risk of qubit error in a first qubit and a first corresponding risk of output error in an output of the first quantum process; and gate-specific data indicative of a relationship between a risk of gate error in a first quantum gate and a second corresponding risk of output error in an output of the first quantum process.

20. A non-transitory computer-readable storage medium that includes executable instructions to cause one or more processor devices to:

obtain first data indicative of a first risk of quantum error associated with a first quantum process;

route, based at least in part on the first data, a first portion of the first quantum process to first quantum hardware implementing a first plurality of qubits in a first quantum code space;

obtain second data indicative of a second risk of quantum error associated with the first quantum process; and route, based at least in part on the second data, a second portion of the first quantum process to second quantum hardware implementing a second plurality of qubits outside of the first quantum code space, wherein each qubit of the first plurality of qubits has a qubit fidelity that is higher than a qubit fidelity of each qubit of the second plurality of qubits.

* * * * *